United States Patent
Lagergren et al.

(10) Patent No.: US 9,239,814 B2
(45) Date of Patent: *Jan. 19, 2016

(54) SYSTEM AND METHOD FOR CREATING OR RECONFIGURING A VIRTUAL SERVER IMAGE FOR CLOUD DEPLOYMENT

(71) Applicant: ORACLE INTERNATIONAL CORPORATION, Redwood Shores, CA (US)

(72) Inventors: Marcus Lagergren, Lidingo (SE); Mikael Vidstedt, Santa Clara, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/164,503

(22) Filed: Jan. 27, 2014

(65) Prior Publication Data
US 2014/0143389 A1    May 22, 2014

Related U.S. Application Data

(63) Continuation of application No. 13/445,722, filed on Apr. 12, 2012, now Pat. No. 8,639,787, which is a continuation-in-part of application No. 12/476,103, filed on Jun. 1, 2009, and a continuation-in-part of (Continued)

(51) Int. Cl.
*G06F 15/177* (2006.01)
*G06F 15/16* (2006.01)
(Continued)

(52) U.S. Cl.
CPC ............... *G06F 15/177* (2013.01); *G06F 8/63* (2013.01); *G06F 9/4401* (2013.01); *G06F 9/45545* (2013.01); *G06F 9/45558* (2013.01); *G06F 9/45533* (2013.01); *G06F 2009/4557* (2013.01);

(Continued)

(58) Field of Classification Search
CPC ............ G06F 9/45558; G06F 9/45533; G06F 2009/4557; G06F 8/63
USPC ......................................... 709/211, 222, 228
See application file for complete search history.

(56) References Cited

U.S. PATENT DOCUMENTS 7,080,378 B1   7/2006   Noland
7,293,168 B2   11/2007  Maeda
(Continued)

FOREIGN PATENT DOCUMENTS

EP   2019358   1/2009

OTHER PUBLICATIONS

International Searching Authority, International Search Report and Written Opinion for PCT International Patent Application No. PCT/US2010/036732, Nov. 30, 2010, 11 pages.

(Continued)

*Primary Examiner* — Hieu Hoang
(74) *Attorney, Agent, or Firm* — Tucker Ellis LLP

(57) ABSTRACT

A system and method to convert a software application, such as a Java application into a virtual server image that is suitable for cloud deployment. In accordance with an embodiment, the system and method allows for building a hypervisor appliance containing a virtual machine running an application. In particular, the hypervisor appliance can be compatible with any hypervisor for server virtualization and the application virtual machine can be a Java Virtual Machine (JVM).

21 Claims, 12 Drawing Sheets

Related U.S. Application Data application No. 12/853,053, filed on Aug. 9, 2010, now Pat. No. 8,776,053.

(60) Provisional application No. 61/476,216, filed on Apr. 15, 2011, provisional application No. 61/246,050, filed on Sep. 25, 2009.

(51) Int. Cl.
    *G06F 9/44* (2006.01)
    *G06F 9/445* (2006.01)
    *G06F 9/455* (2006.01)

(52) U.S. Cl.
    CPC ............... *G06F 2009/45562* (2013.01); *G06F 2009/45575* (2013.01)

(56) References Cited

U.S. PATENT DOCUMENTS

| | | | |
|---|---|---|---|
| 8,156,301 B1 | 4/2012 | Khandelwal | |
| 8,176,486 B2 | 5/2012 | Husain | |
| 8,219,653 B1 | 7/2012 | Keagy | |
| 8,321,558 B1 | 11/2012 | Sirota | |
| 8,381,264 B1 | 2/2013 | Corddry | |
| 8,458,717 B1 | 6/2013 | Keagy | |
| 8,468,535 B1 | 6/2013 | Keagy | |
| 2003/0217131 A1 | 11/2003 | Hodge | |
| 2005/0198303 A1 | 9/2005 | Knauerhase | |
| 2006/0010176 A1 | 1/2006 | Armington | |
| 2007/0033586 A1 | 2/2007 | Hirsave | |
| 2007/0078988 A1 | 4/2007 | Miloushev | |
| 2007/0234302 A1 | 10/2007 | Suzuki | |
| 2007/0294676 A1 | 12/2007 | Mellor | |
| 2007/0300205 A1 | 12/2007 | Scian | |
| 2008/0059556 A1 | 3/2008 | Greenspan | |
| 2008/0201414 A1 | 8/2008 | Husain | |
| 2008/0244596 A1 | 10/2008 | Mansker et al. | |
| 2008/0263258 A1 | 10/2008 | Allwell | |
| 2008/0271016 A1 | 10/2008 | Chess | |
| 2008/0295092 A1 | 11/2008 | Tan | |
| 2009/0006534 A1* | 1/2009 | Fries et al. | 709/203 |
| 2009/0036111 A1 | 2/2009 | Danford | |
| 2009/0070752 A1 | 3/2009 | Aplern | |
| 2009/0094603 A1* | 4/2009 | Hiltgen et al. | 718/1 |
| 2009/0100420 A1 | 4/2009 | Sapuntzakis | |
| 2009/0113423 A1 | 4/2009 | Hiltgen | |
| 2009/0164994 A1 | 6/2009 | Vasilevsky | |
| 2009/0172662 A1 | 7/2009 | Liu | |
| 2009/0249284 A1 | 10/2009 | Antosz | |
| 2009/0249287 A1 | 10/2009 | Patrick | |
| 2009/0276771 A1 | 11/2009 | Nickolov | |
| 2009/0300151 A1 | 12/2009 | Friedman | |
| 2009/0319688 A1* | 12/2009 | Mason et al. | 709/242 |
| 2010/0027552 A1 | 2/2010 | Hill | |
| 2010/0070970 A1 | 3/2010 | Hu | |
| 2010/0095297 A1 | 4/2010 | Sethi | |
| 2010/0115174 A1* | 5/2010 | Akyol et al. | 710/316 |
| 2010/0162238 A1 | 6/2010 | Warfield | |
| 2010/0223383 A1* | 9/2010 | Salevan et al. | 709/226 |
| 2010/0250744 A1* | 9/2010 | Hadad et al. | 709/226 |
| 2010/0287280 A1 | 11/2010 | Sivan | |
| 2010/0306599 A1* | 12/2010 | Cota-Robles et al. | 714/48 |
| 2010/0306772 A1 | 12/2010 | Arnold | |
| 2012/0151198 A1 | 6/2012 | Gupta | |
| 2013/0276068 A1 | 10/2013 | Gupta | |

OTHER PUBLICATIONS

Krsul, et al., VMPlants: Providing and Managing Virtual Machine Execution Environments for Grid Computing, 2004, 12 pages.

Sapuntzakis, et al., Virtual Appliances for Deploying and Maintaining Software, 2003, 15 pages.

Sapuntzakis, et al., Virtual Appliances in the Collective: A Road to Hassle-Fee Computing, 2003, 6 pages.

Magoutis, et al., Galapagos: Automatically Discovering Application-Data Relationships in Networked Systems, 2007, 6 pages.

* cited by examiner

SYSTEM AND METHOD FOR CREATING OR RECONFIGURING A VIRTUAL SERVER IMAGE FOR CLOUD DEPLOYMENT

CLAIM OF PRIORITY

The present application is a continuation of U.S. patent application Ser. No. 13/445,722, titled "SYSTEM AND METHOD FOR CREATING OR RECONFIGURING A VIRTUAL SERVER IMAGE FOR CLOUD DEPLOYMENT", filed Apr. 12, 2012, now U.S. Pat. No. 8,639,787, issued on Jan. 28, 2014, which claims the benefit of priority to U.S. Provisional Patent Application No. 61/476,216, titled "SYSTEM AND METHOD FOR CREATING OR RECONFIGURING A VIRTUAL SERVER IMAGE FOR CLOUD DEPLOYMENT", filed Apr. 15, 2011; and is a continuation-in-part of U.S. patent application Ser. No. 12/476,103, titled "SYSTEM AND METHOD FOR CONVERTING A JAVA APPLICATION INTO A VIRTUAL SERVER IMAGE FOR CLOUD DEPLOYMENT", filed Jun. 1, 2009, which is now U.S. Pat. No.: 8,856,294, issued on Oct. 7, 2014; and is also a continuation-in-part of U.S. patent application Ser. No. 12/853,053, titled "SYSTEM AND METHOD TO RECONFIGURE A VIRTUAL MACHINE IMAGE SUITABLE FOR CLOUD DEPLOYMENT", filed Aug. 9, 2010, which is now U.S. Pat. No.: 8,776,053, issued on Jul. 8, 2014, which claims the benefit of priority to U.S. Provisional Patent Application No. 61/246,050, titled "SYSTEM AND METHOD TO RECONFIGURE A VIRTUAL MACHINE IMAGE SUITABLE FOR CLOUD DEPLOYMENT", filed Sep. 25, 2009; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to application servers and virtual machines, and particularly to a system and method for creating or reconfiguring a virtual server image for cloud deployment.

BACKGROUND

Cloud computing is generally defined as a form of computing in which dynamic and/or virtualized resources are provided as services over a distributed network of physical computing machines or servers, such as the Internet. Client processes, software applications, and users thereof, are not required to have explicit knowledge or control over the technology infrastructure within the cloud. Instead, they can request or call upon services from the cloud, which are then provided by other providers within the cloud. As such, cloud computing promises software application developers with an easy means way of deploying their application to run simultaneously upon thousands of servers in a cloud.

To date, different solutions of deploying software applications in a cloud have emerged that are generally cloud-specific, i.e. the applications need to conform to a cloud/hypervisor specific application program interface (API) to run on their servers. Using this methodology, it is not easy for a cloud customer to migrate an application from one cloud provider to another cloud provider.

Cloud providers can address this problem somewhat by offering hypervisors in their clouds. Generally, a hypervisor acts as a layer between a server's hardware and its operating system. This provides an abstraction layer that allows each physical server to run one or more virtual servers, and effectively decouples the operating system and its applications from the underlying physical server. When used in a cloud, the cloud customer can supply a virtual machine image which contains the customer application to the hypervisor. The image will then be booted in potentially thousands of hypervisors in the cloud. Since there are generally only a few hypervisor types this approach standardizes the format for how the application developer has to package the application. Instead of creating a standalone application that fits into a specific cloud API, the developer now has to create a suitable virtual machine image.

However, the underlying problem remains as to how a software developer can convert their own, e.g. Java, application into a virtual machine image that can be easily deployed on many machines in a cloud. With current development tools the developer must create a virtual machine image that boots (or resumes) into the Java application. Generally, a virtual machine image has to be constructed by booting an operating system inside a hypervisor. From within this virtual operating system the boot process must be configured to start the application. Then the virtual machine is powered down, and a copy of the virtual machine image (which includes the disk) distributed to machines that run virtual images in a cloud. This is a very time consuming process, and is an area that embodiments of the present invention are intended to address.

SUMMARY

Disclosed herein is a system and method to convert a software application, such as a Java application into a virtual server image that is suitable for cloud deployment. In accordance with an embodiment, the system and method allows for building a hypervisor appliance containing a virtual machine running an application. In particular, the hypervisor appliance can be compatible with any hypervisor for server virtualization and the application virtual machine can be a Java Virtual Machine (JVM).

DETAILED DESCRIPTION

Figure 1:
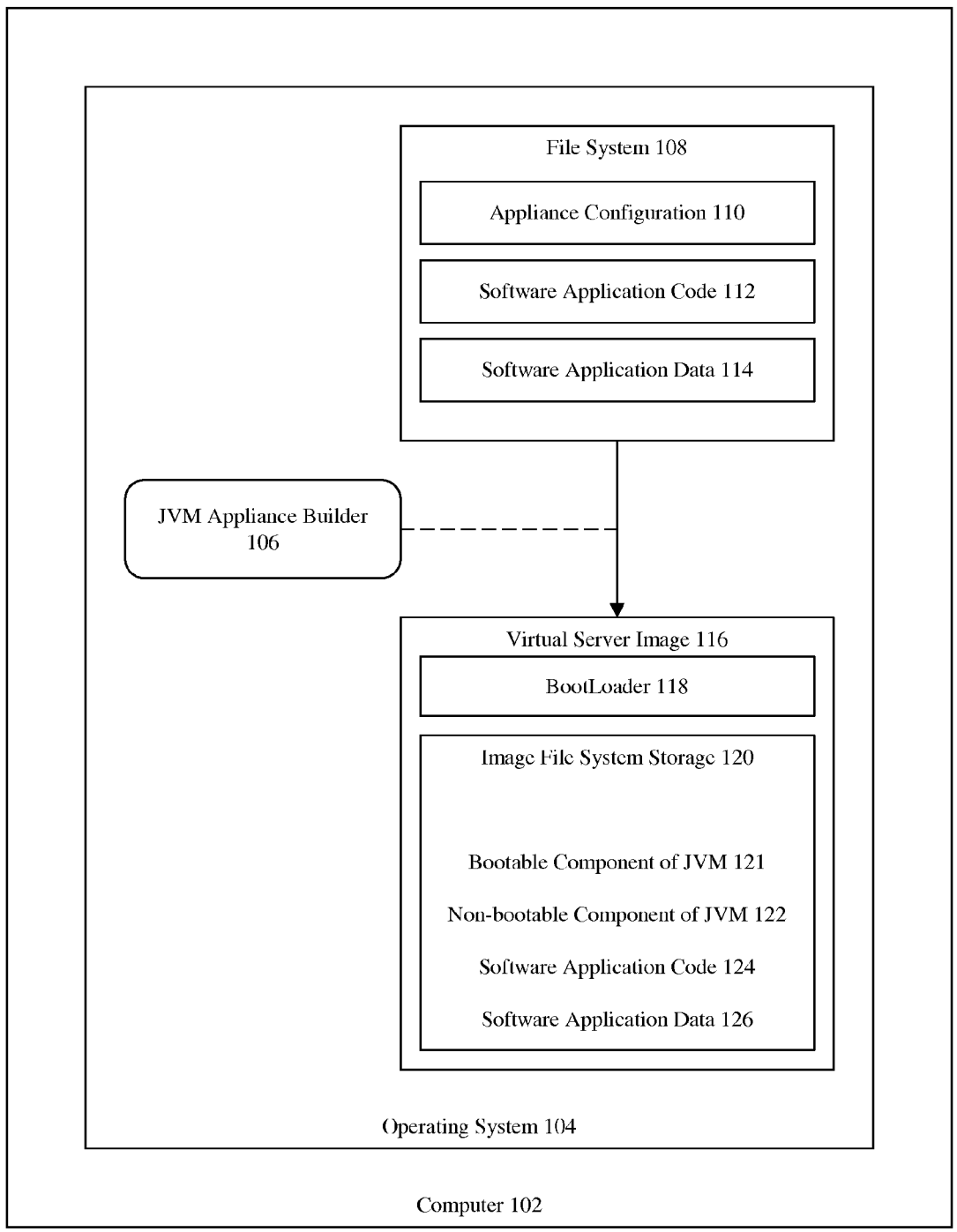
FIG. 1 shows an illustration of a system in accordance with an embodiment.

Disclosed herein is a system and method to convert a software application, such as a Java application into a virtual machine image that is suitable for cloud deployment. In accordance with an embodiment, the system and method allows for building a hypervisor appliance containing a second virtual machine running an application. In particular, the hypervisor appliance can be compatible with any hypervisor for server virtualization and the application virtual machine can be a Java Virtual Machine (JVM).

In accordance with an embodiment, the system includes an appliance builder application, that allows the system to take a Java application, and convert the application into a virtual server image that can then be deployed in a hypervisor, or for example within a cloud of hypervisors. In accordance with an embodiment, the generated virtual server image is a combination of a bootable part of a Java virtual machine, and a non-bootable part of the Java virtual machine, wherein the bootable part can subsequently load the non-bootable part. The non-bootable part of the Java virtual machine can then execute a Java application stored in the same virtual server image.

The appliance builder addresses the following problems:

Efficiency of creating the virtual server image. The bootable part of the Java virtual machine is significantly smaller than a general purpose operating system.

Fast booting of the Java application. The bootable part of the Java virtual machine has to perform significantly less work before it can start the non-bootable part of the Java virtual machine than a general purpose operating system.

Ease of generating virtual machine images for any hypervisor type, for example VMWare Player, Workstation and ESX, and OracleVM. The builder itself can be written in Java for platform transparency.

Significantly faster than alternative solutions that are based on actually running the hypervisor and setting up the application environment, and then taking a snapshot using the hypervisor.

A typical use of the appliance builder would be to take an application intended for deployment on an application server (such as a Weblogic server application that serves Web pages), and convert the application into an appliance. For example, a Weblogic server can be set up and started using the command:

```
java -cp . . . -jar server/weblogic.jar server/data
```

In accordance with an embodiment, an appliance configuration can be created for this setup as shown below:

```
<?xml version="1.0" encoding="UTF-8"?>
<applianceconfig xmlns:xsi="http://www.w3.org/2001/XMLSchema-
```

-continued

```
instance" xsi:noNamespaceSchemaLocation="applianceconfig.xsd"
version="2.5">
  <virtual-appliance memory="256 MB" cpus="1" disk="160 MB">
    <vm-name>default-vm</vm-name>
    <working-dir>/weblogic</working-dir>
    <java-arguments>-jar server/weblogic.jar server/data</java-
arguments>
    <network>
      <nics>
        <nic type="bridged"/>
      </nics>
    </network>
  </virtual-appliance>
</applianceconfig>
```

An alternative example of an appliance configuration file, for a different example application, is shown below:

```
<applianceconfig xmlns:xsi="http://www.w3.org/2001/
XMLSchema-instance"
xsi:noNamespaceSchemaLocation="applianceconfig.xsd" version="2.5">
  <virtual-appliance memory="1 GB" cpus="1" disk="256 MB">
    <vm-name>default-vm</vm-name>
    <working-dir>/application/myworkdir</working-dir>
    <java-arguments>-cp $JAVA_HOME/lib/tools.jar:. -Xmx128m -jar
MyApp.jar arg0 arg1 arg2</java-arguments>
    <nfs-mounts>
      <nfs-mount uid="513" gid="503">
        <mount-point>/test</mount-point>
        <server>file01.jrockitve.oracle.com</server>
        <server-path>/temp/user/testdir</server-path>
      </nfs-mount>
    </nfs-mounts>
    <kernel-arguments>
      <entry key="logLog" value="all"/>
      <entry key="netTcpTtl" value="20"/>
    </kernel-arguments>
    <network>
      <dns>
        <server-order>        <server ip="172.22.17.100"/>
          <server ip="192.168.1.2"/>
        </server-order>
        <lookup-order>
          <name suffix="us.oracle.com"/>
          <name suffix="jrpg.oracle.com"/>
        </lookup-order>
      </dns>
      <nics>
        <nic network="eth0" type="bridged">
          <ip>172.23.22.22</ip>
          <netmask>255.255.255.0</netmask>
          <gateway>172.23.22.1</gateway>
          <mac>12:ab:34:cd:56:ef</mac>
        </nic>
      </nics>
      <hostname>example.oracle.com</hostname>
    </network>
    <locale-data>
      <locale>en_US</locale>
      <timezone>US/Pacific</timezone>
      <encoding>ISO-8859-1</encoding>
    </locale-data>
  </virtual-appliance>
  <jrockitve-image-url>ftp://jrockitve/jrockitve.bin</jrockitve-image-
url>
  <java-application-dir>path_to_java_application_dir</java-
application-dir>
</applianceconfig>
```

As described in further detail below, the appliance configuration can then be used to create a virtual server image for deployment in a cloud.

FIG. 1 shows an illustration of a system in accordance with an embodiment of the invention. As shown in FIG. 1, the system includes a computer 102 with a general operating system 104 executing thereon. The operating system maintains a file system 108, which in turn comprises an appliance configuration 110 or configuration file, a software application code 112, and a software application data 114.

In accordance with an embodiment, a Java virtual machine appliance builder 106, or a builder logic within the system, uses the appliance configuration 110 to create a virtual server image 116, which in turn comprises a bootloader 118; and an image file system storage 120.

The image storage comprises a bootable component of the Java virtual machine 121, a non-bootable component of the Java virtual machine 122, the software application code 124, and the software application data 126. The virtual server image can then be deployed within a cloud, and the non-bootable component of the Java virtual machine used to execute the Java application stored within the same virtual server image.

Figure 2:
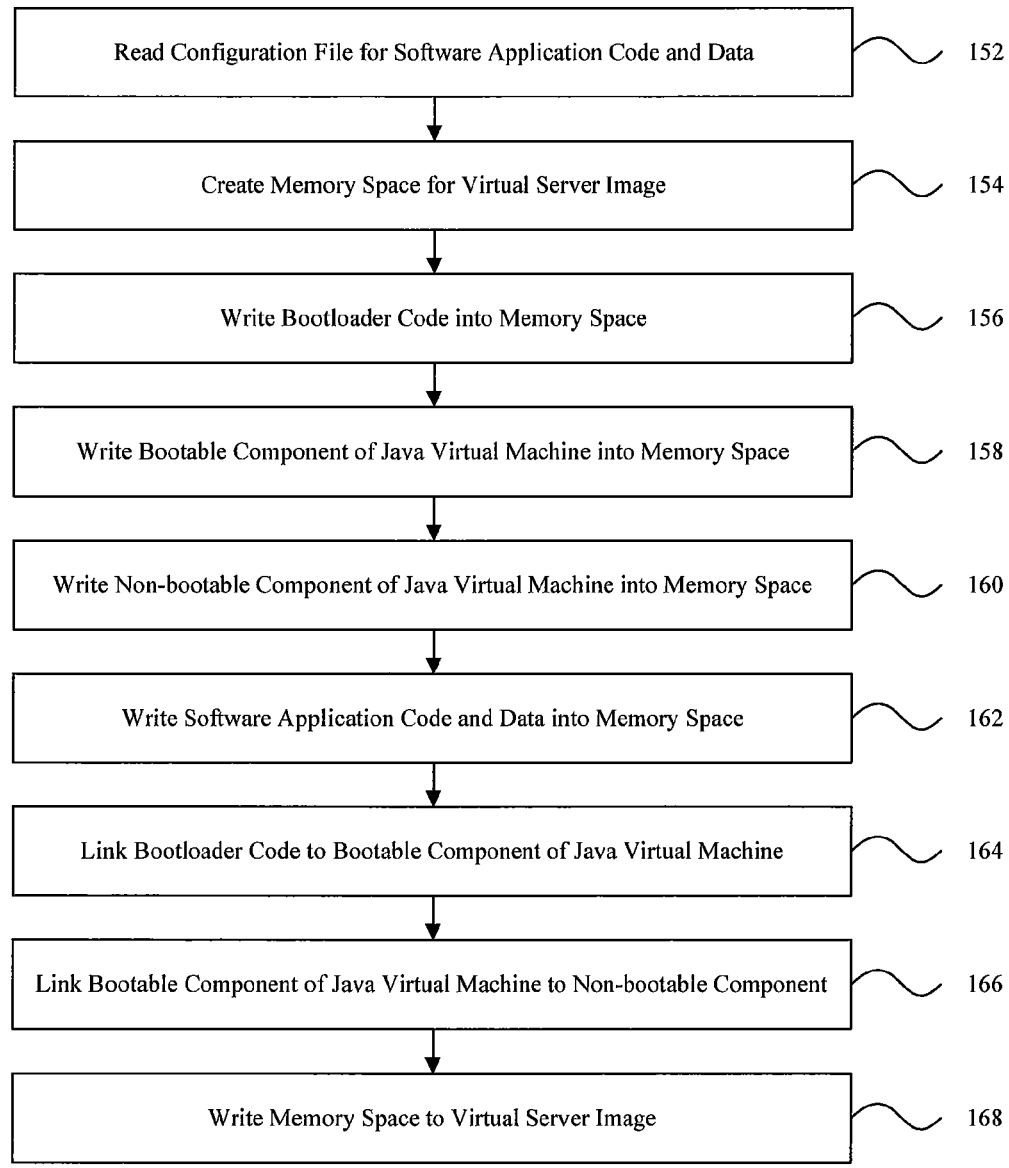
FIG. 2 shows a flowchart of a method in accordance with an embodiment, for generating a JVM appliance.

FIG. 2 shows a flowchart of a method in accordance with an embodiment, for generating a Java virtual machine (JVM) appliance. In accordance with an embodiment, the appliance builder is first started on the system as a standard Java application, such as:

java-jar appliance_builder.jar [hypervisor_type] [config_file]

As shown in FIG. 2, in step 152 the appliance builder reads the configuration file, and uses the instructions from the command line to determine which type of hypervisor is selected, and a configuration file to locate a software application code, a software application data, network settings, time and date and network file systems. In step 154, the appliance builder creates a memory space within the system for use by the virtual server image. In accordance with one embodiment such a memory space can reside in RAM. In accordance with an alternative embodiment the memory space can be a file in a file system. In step 156, the virtual server image is initialized with the bootloader code. Whether a bootloader code is placed into the virtual server image depends on which type of hypervisor type was selected when first starting the appliance builder.

Some hypervisors (for example, the VMWare hypervisor) use virtual server images that are effectively a snapshot of the sectors of a virtual hard disk. In accordance with an embodiment, for these hypervisors the bootloader code can be written into the first sector of the first bootable partition of the virtual hard disk. A bootloader, such as GRUB (GRand Unified Bootloader, provided as part of the GNU project), or a different type of bootloader, can be used for this purpose. The bootloader will then load the bootable part of the JVM from the file system in the virtual server image. If the GRUB bootloader is used, then the bootloader will use a configuration file located at /boot/grub/menu.cfg in the file system in the virtual server image, to find the bootable part of the JVM. Other types of bootloaders can use alternate configuration means.

Other hypervisors (for example, the Xen and Oracle VM hypervisors) use a standard file system format (for example, ext2) for their client images. In accordance with an embodiment, these hypervisors behave as GRUB or as a bootloader, and will read the /boot/grub/menu.cfg themselves. Therefore the virtual server images for these hypervisors do not contain the bootloader code.

Next, in step 158, a bootable component of the Java virtual machine is written to the virtual server image in the memory space.

In step 160, a non-bootable component of the Java virtual machine is written to the memory space together with, in step 162, the application code and data. In step 164, the bootloader code is then configured to execute the bootable component of the Java virtual machine. In one embodiment this can be done by updating /boot/grub/menu.cfg. In an alternative embodiment this can be done by updating the bootloader code itself. In step 166, the bootable component of the Java virtual machine is then configured to execute the non-bootable part of the Java virtual machine. The bootable component of the JVM is updated with the location of the non-bootable part of the JVM and the other information from the configuration file described earlier. In one embodiment this can be done by updating a file in the file system 120. In an alternative embodiment this can be done by updating the bootable component of the JVM itself.

In step 168, if the memory space was allocated in RAM, then the memory space is then written to a virtual server image. If the memory space was a file, then that file is now the virtual server image. This virtual server image can then be deployed throughout a cloud of hypervisors using the management tools generally provided with such cloud environments.

Figure 3:
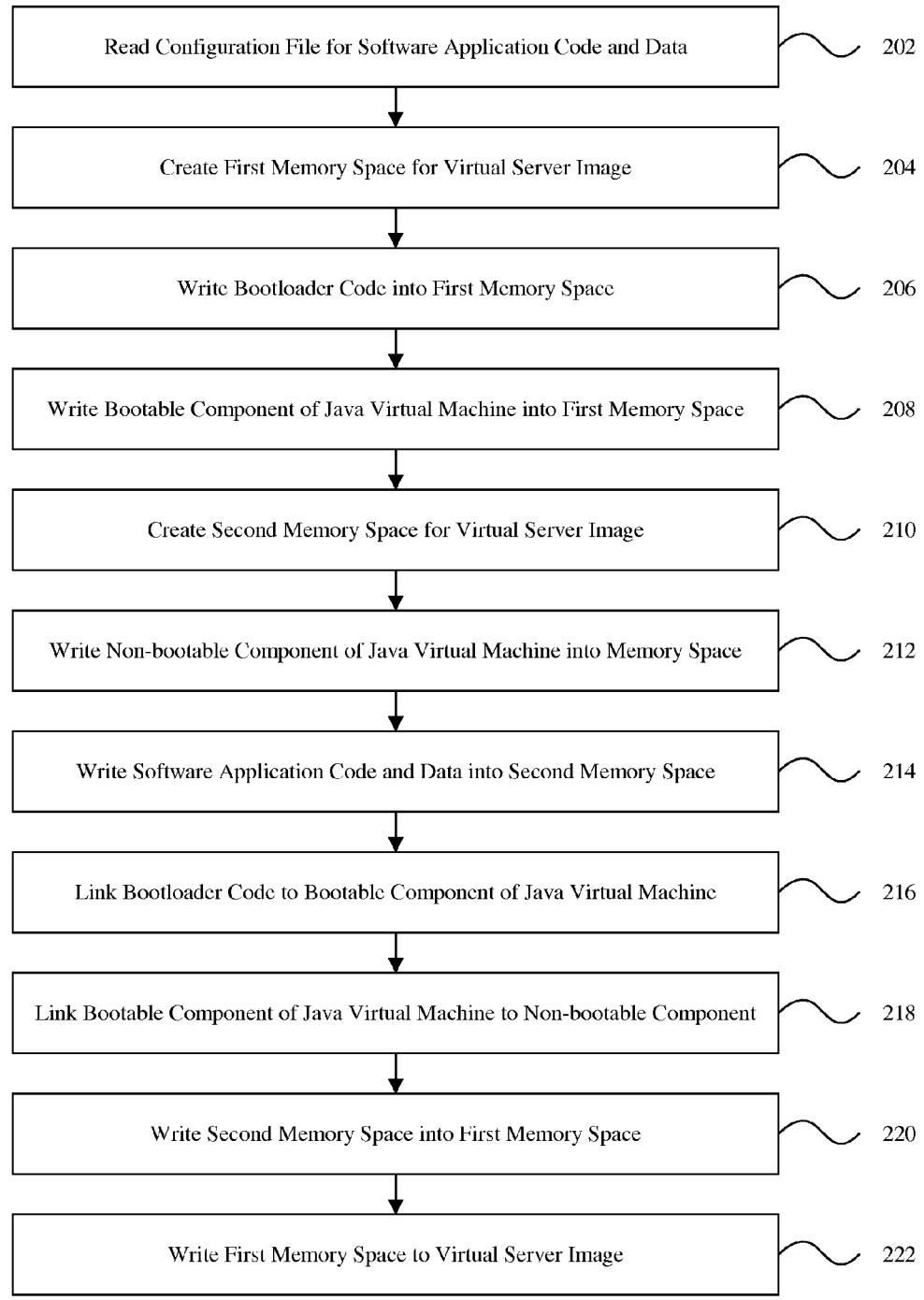
FIG. 3 shows a flowchart of a method in accordance with an alternative embodiment, for generating a JVM appliance.

FIG. 3 shows a flowchart of a method in accordance with an alternative embodiment, for generating a Java virtual machine (JVM) appliance. In particular, FIG. 3 illustrates the use of two or more memory spaces, which can be subsequently copied, concatenated, or otherwise used to prepare the virtual server image. As with the example described above, depending on the hypervisor used, the client image can either contain the bootloader code (for example, VMware), or can eliminate the need for the bootloader code (for example, Xen and Oracle VM).

As shown in FIG. 3, in step 202, the appliance builder reads the configuration file, and uses the instructions from the command line file to determine which type of hypervisor is selected, and a configuration file to locate a software application code, a software application data, network settings, time and date and network file systems. In step 204, the appliance builder creates a first memory space within the system for use by the virtual server image. In step 206, the virtual server image is initialized with the bootloader code. In step 208, a bootable component of the Java virtual machine is written to the virtual server image. In step 210, a second memory space is created within the system that will contain the image file system storage. In step 212, a non-bootable component of the Java virtual machine is written to the secondary memory space together with, in step 214, the application code and data. In step 216, the bootloader code is then configured to execute the bootable component of the Java virtual machine. In step 218, the bootable component of the Java virtual machine is then configured to execute the non-bootable part of the Java virtual machine. In step 220, the second memory space is then written into the first memory space, and in step 222, the first memory space is then written to a virtual server image.

Figure 4:
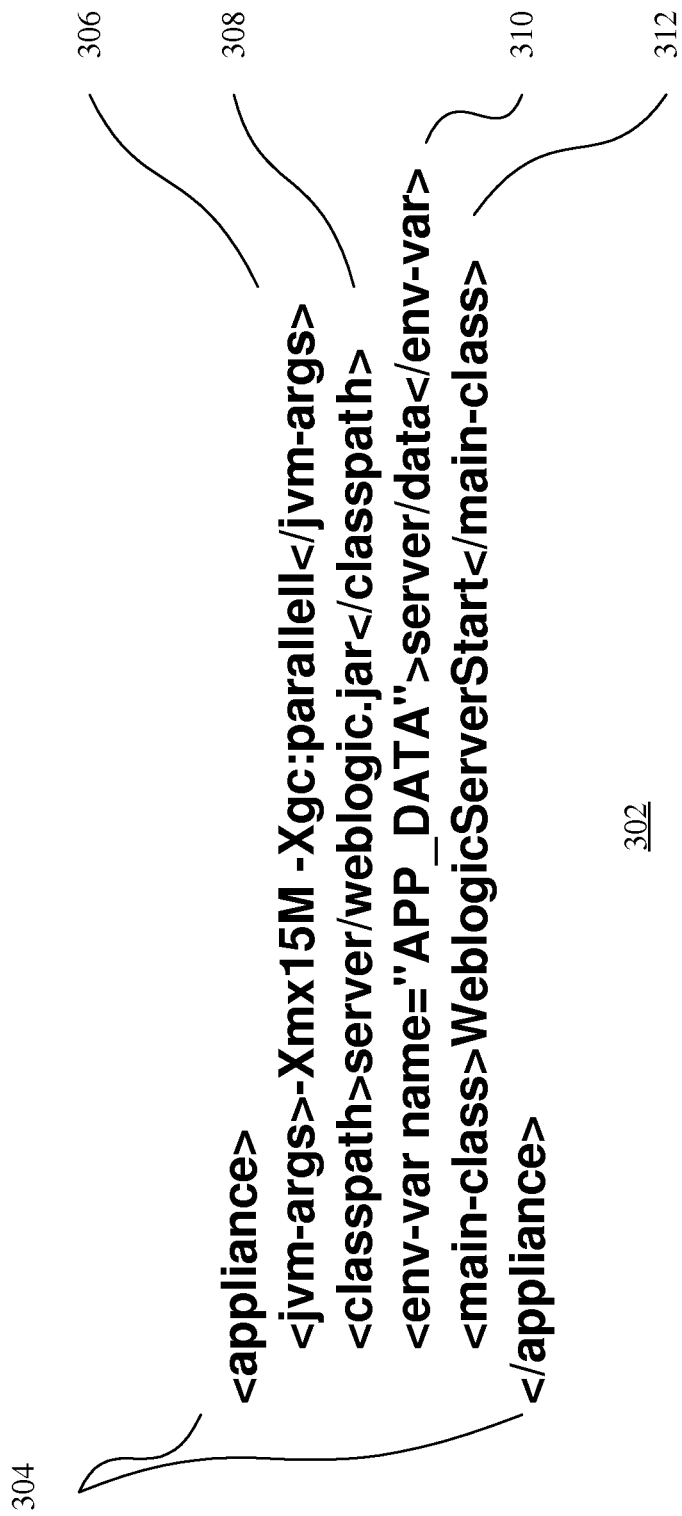
FIG. 4 shows an illustration of the contents of an appliance configuration in accordance with an embodiment.

FIG. 4 shows an illustration of the contents of an appliance configuration in accordance with an embodiment. As shown in FIG. 4, the appliance configuration 302 can be stored in a file on a computer readable medium or in a memory and includes, in accordance with an embodiment, appliance tags 304, indicating that the configuration file is intended to specify a virtual server image; a jvm-arguments component 306 defining how the non-bootable component of the Java virtual machine will be started; an application classpath component 308 defining the location of the application code; an application environment-variable component 310 defining the location of the application data; and additional components 312 defining additional variables.

Figure 5:
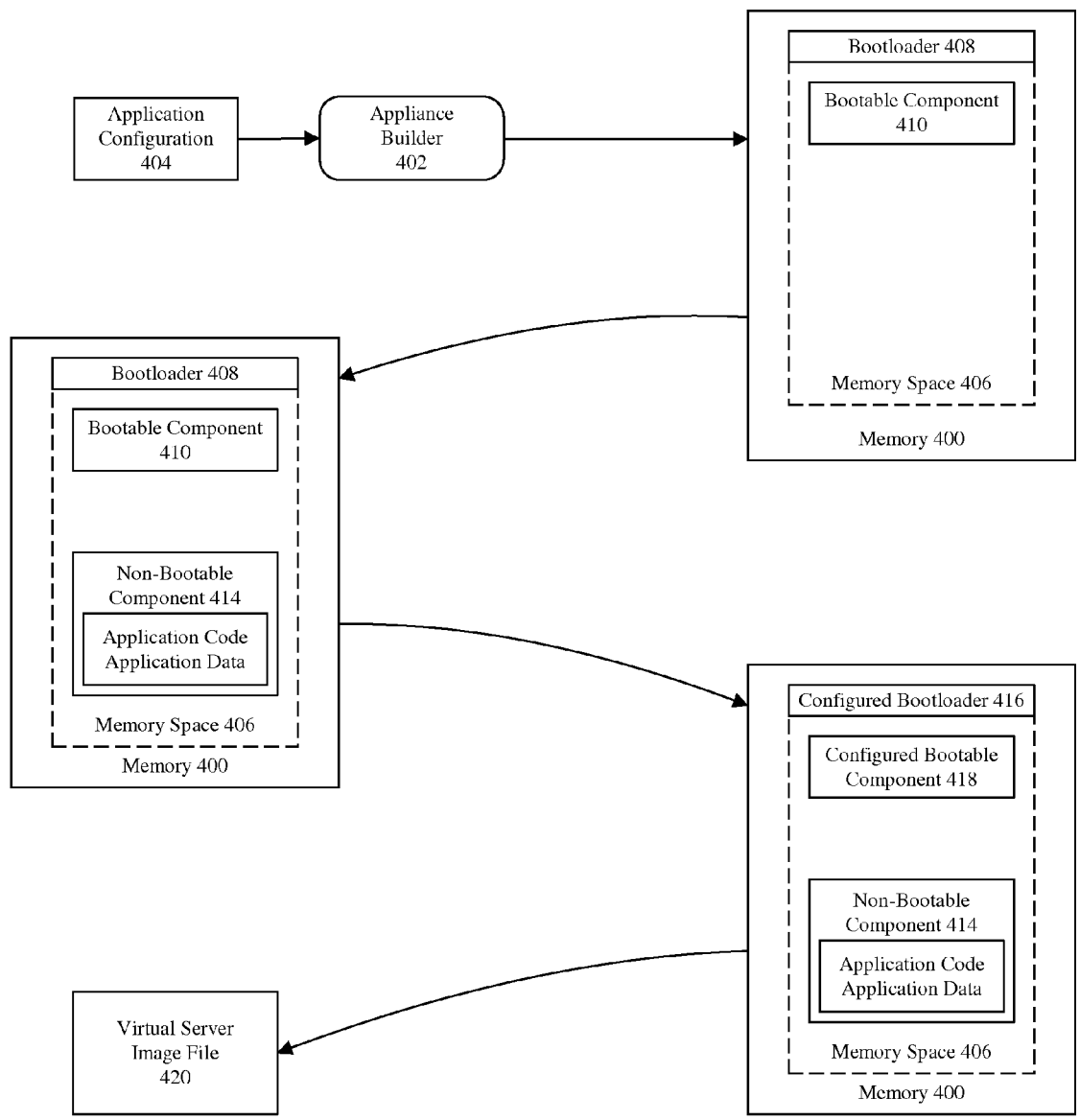
FIG. 5 shows an illustration of how a virtual server image is created, in accordance with an embodiment.

FIG. 5 shows an illustration of how a virtual server image is created, in accordance with an embodiment and the method described in FIG. 2. As shown in FIG. 5, the appliance builder 402 reads the configuration file 404, and uses the instructions therein to determine the type of hypervisor, and to locate a software application code and software application data. A memory space 406 is created within the system memory 400 for use by the virtual server image. The memory space/virtual server image is initialized with bootloader code 408, and a bootable component of the Java virtual machine 410 is written therein. A non-bootable component of the Java virtual machine 414 is then written therein, together with the application code and data. The bootloader code is then configured 416 to execute the bootable component of the Java virtual machine, and the bootable component of the Java virtual machine is configured 418 to execute the non-bootable part of the Java virtual machine. The memory space is then written to a virtual server file image 420, which can then be deployed throughout a cloud of hypervisors. In accordance with an alternative embodiment the memory space can be transmitted over a network to a cloud for deployment without storing a local file image.

Figure 6:
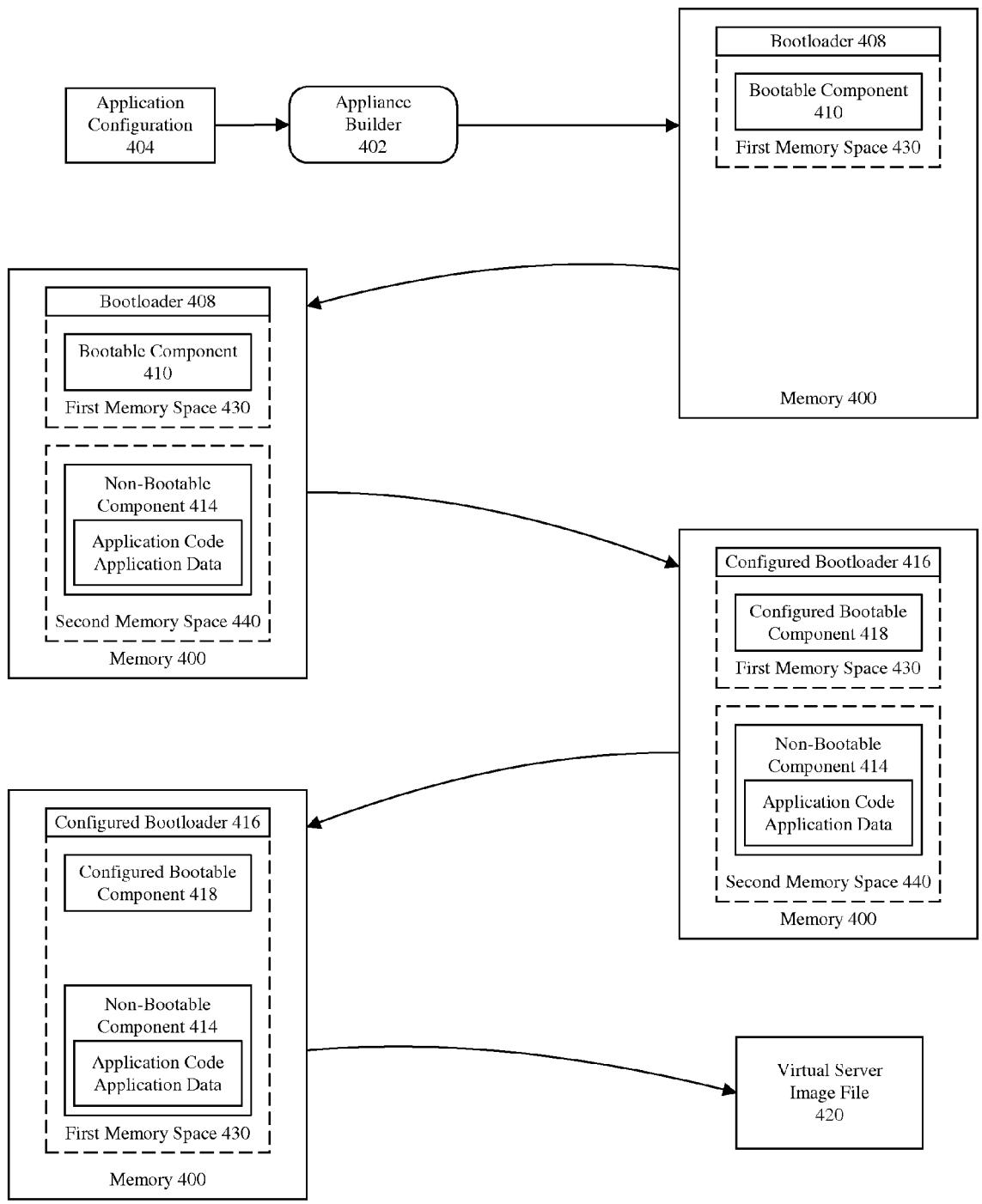
FIG. 6 shows an illustration of how a virtual server image is created, in accordance with an alternative embodiment.

FIG. 6 shows an illustration of how a virtual server image is created, in accordance with an alternative embodiment, and the method described in FIG. 3. In particular, FIG. 6 similarly illustrates the use of two or more memory spaces, which can be subsequently copied, concatenated, or otherwise used to prepare the virtual server image. As shown in FIG. 6, the appliance builder 402 reads the configuration file 404, and uses the instructions therein to determine the type of hypervisor, and to locate a software application code and software application data. A first memory space 430 is created within the system memory 400 for use by the virtual server image, the first memory space/virtual server image initialized with bootloader code 408, and a bootable component of the Java virtual machine 410 is written therein. A second memory space 440 is then created that will contain the image file system storage, and a non-bootable component of the Java virtual machine 414 is written therein, together with the application code and data. The bootloader code is then configured 416 to execute the bootable component of the Java virtual machine, and the bootable component of the Java virtual machine is configured 418 to execute the non-bootable part of the Java virtual machine. The second memory space is then written into the first memory space, and the first memory space is then written to a virtual server file image 420, which can then be deployed throughout a cloud of hypervisors. In accordance with an alternative embodiment the first memory space can be transmitted over a network to a cloud for deployment without storing a local file image.

Figure 7:
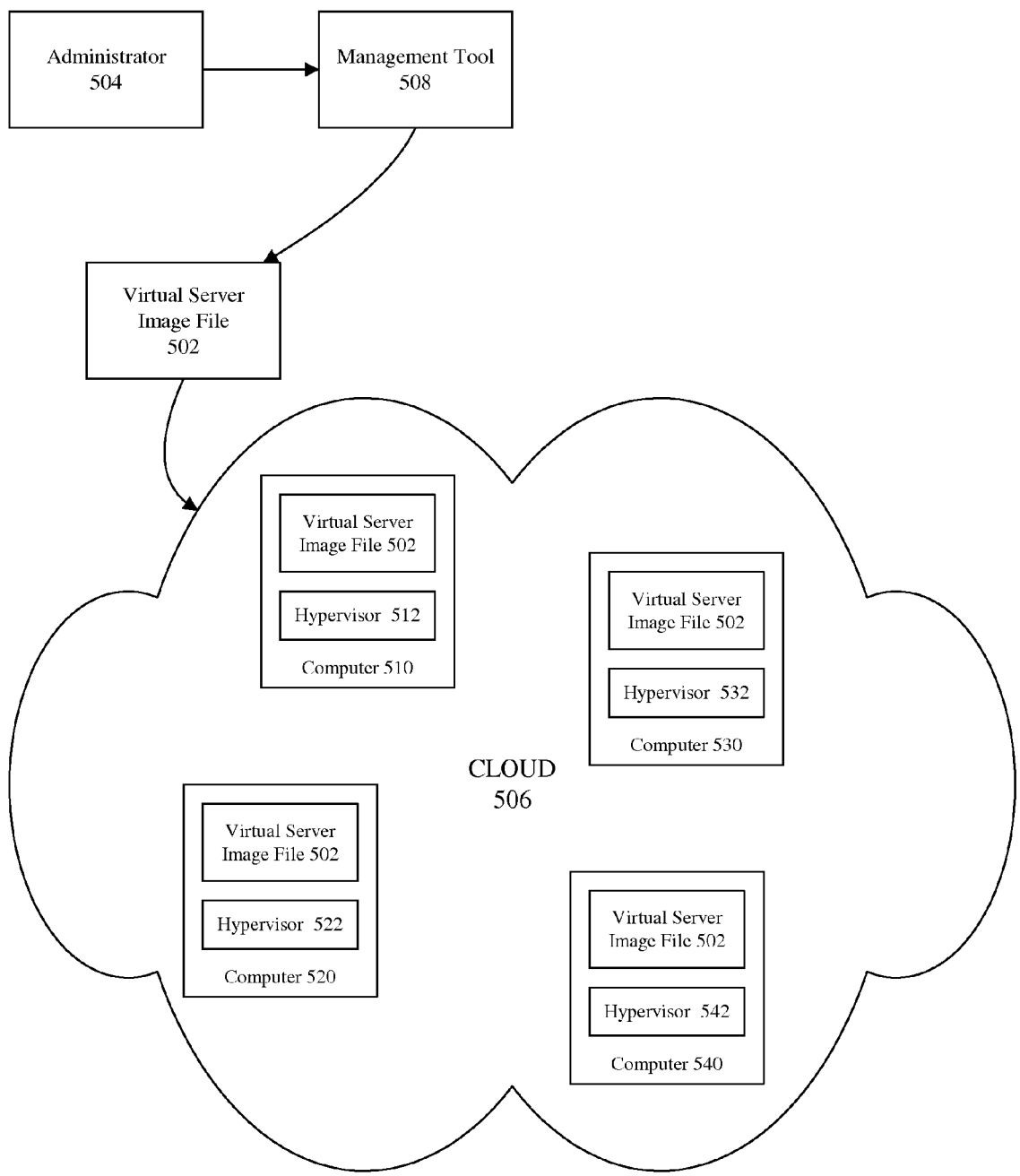
FIG. 7 shows an illustration of how a virtual server image can be deployed to a cloud, accordance with an embodiment.

FIG. 7 shows an illustration of how a virtual server image can be deployed to a cloud, accordance with an embodiment. As shown in FIG. 7, once the virtual server file image 502 is created, an administrator 504 can deploy the virtual server file image throughout a cloud 506 of hypervisors 512, 522, 532, 542 (each associated with one or more computers 510, 520, 530, 540), using the management tools 508 generally provided with such cloud environments.

Reconfiguring of Virtual Machine Image

Also disclosed herein is a system and method that can be used to reconfigure a virtual server image comprising a Java virtual machine and a Java application, that is suitable for cloud deployment. In accordance with an embodiment, the system and method allows for updating a Java virtual machine and its configuration, inside a virtual server image. In accordance with another embodiment, the Java virtual machine is bootable and comprises a minimal operating system suitable only to run a single Java virtual machine instance. In accordance with another embodiment, the system and method allows for updating the Java application within the virtual server image. In particular, the virtual server image can be compatible with any hypervisor for server virtualization and the application virtual machine can be a Java Virtual Machine (JVM) or any other virtual machine for running software applications.

Cloud computing is generally defined as a form of computing in which dynamic and/or virtualized resources are provided as services over a distributed network of physical computing machines or servers, such as the Internet. Client processes, software applications, and users thereof, are not required to have explicit knowledge or control over the technology infrastructure within the cloud. Instead, they can request or call upon services from the cloud, which are then provided by other providers within the cloud. As such, cloud computing promises software application developers with an easy means way of deploying their application to run simultaneously upon thousands of servers in a cloud.

To date, different solutions of deploying software applications in a cloud have emerged that are generally cloud specific, i.e. the applications need to conform to a cloud/hypervisor specific application program interface (API) to run on their servers. Using this methodology, it is not easy for a cloud customer to migrate an application from one cloud provider to another cloud provider.

Cloud providers can address this problem somewhat by offering hypervisors in their clouds. Generally, a hypervisor acts as a layer between a server's hardware and its operating system. This provides an abstraction layer that allows each physical server to run one or more virtual servers, and effectively decouples the operating system and its applications from the underlying physical server. When used in a cloud, the cloud customer can supply a virtual machine image which contains the customer application to the hypervisor. The image will then be booted in potentially thousands of hypervisors in the cloud. Since there are generally only a few hypervisor types this approach standardizes the format for how the application developer has to package the application. Instead of creating a standalone application that fits into a specific cloud API, the developer now has to create a suitable virtual machine image.

U.S. patent application Ser. No. 12/476,103, titled "SYSTEM AND METHOD FOR CONVERTING A JAVA APPLICATION INTO A VIRTUAL SERVER IMAGE FOR CLOUD DEPLOYMENT", filed Jun. 1, 2009, the disclosure of which is provided above and is also herein incorporated by reference, teaches how to create such a virtual machine image automatically from a Java application. Such a created virtual machine image can be large, depending on the Java application contained therein. The image can also grow in size when the virtual machine image is executed. For example, application generated data and log files can be stored within the image, and such an image can grow to several gigabytes in size.

Since it is usually unavoidable that the Java application or the JVM contained within the virtual machine image will have to be updated there is a need for a tool that can efficiently update such a virtual server image and do so without disturbing the accumulated application data.

In accordance with an embodiment, the system includes a virtual server image updater, that allows the system to take a virtual server image and reconfigure it according to a specification within a virtual server image patch. The reconfigured virtual server image can then be deployed in a hypervisor, or for example within a cloud of hypervisors. In accordance with another embodiment the virtual server image patch is distributed to the computers within a cloud and applied locally on each computer. In another embodiment the Java application is suspended, followed by a shutdown of the virtual server image, the virtual server image is then patched, and finally the virtual server is booted and the Java application resumed.

In accordance with an embodiment, the updater will create an inverse virtual server image patch that, when applied to the reconfigured virtual server image, will restore it to its original state. The virtual server image updater addresses the following problems or features:

- Efficiency of updating a virtual server image. The bootable part of the Java virtual machine is significantly smaller than a general purpose operating system. This makes it possible to upgrade both the bootable, and the non-bootable, part of the JVM with a minimal patch file.
- Ability to update properties in the bootable part of the JVM, comprising how many cpu's to expose to the non-bootable part of the JVM, as well as the maximum amount of physical ram and disk.
- Ability to update the startup arguments for the non-bootable part of the JVM.
- Ability to reconfigure the Java application and its startup arguments without disturbing the Java application data and state.
- Ability to rewrite the virtual server image from one hypervisor to a different hypervisor without disturbing the Java application data or state.
- Ease of use. An administrative person is provided with a tool that works on finished appliances without the need for unpacking, patching and then recreating the appliance.

A typical use of the virtual server image updater would be to take a virtual server image comprising a Weblogic Virtual Edition (VE) installation and reconfigure the virtual server image in such a way that: the Java virtual machine is upgraded to a newer version, both the bootable part and the non-bootable part; the bootable part of the Java virtual machine should use four virtual cpu's; the startup arguments for non-bootable part of the Java virtual machine that later starts Weblogic VE are modified to include a -Xms512M, to set the startup size of the Java heap; and a jar file within the Weblogic installation is replaced with a new jar file, and a configuration file is updated.

java-jar updater.jar [patch_file] [virtual_server_image file]

In accordance with an embodiment, a patch file can be created for this setup as:

```
<reconfigure>
    <new-bootable> . . Base64 encoded archive . . . </new-bootable>
    <add-to-bootable-config>-cpu=4 < /add-to-bootable-config>
    <new-JVM> . . Base64 encoded archive . . . </new-JVM>
    <add-to-jvm-config>-Xms512M< / add-to-jvm-config>
    <new-jar-file    file=" /app/lib/setup.jar" > . . Base64   encoded
jar . . .
    </new-jar-file>
    <patch file="/app/etc/setup.cfg" > . . Base64 encoded diff . . .
    </patch>
</reconfigure>
```

Figure 8:
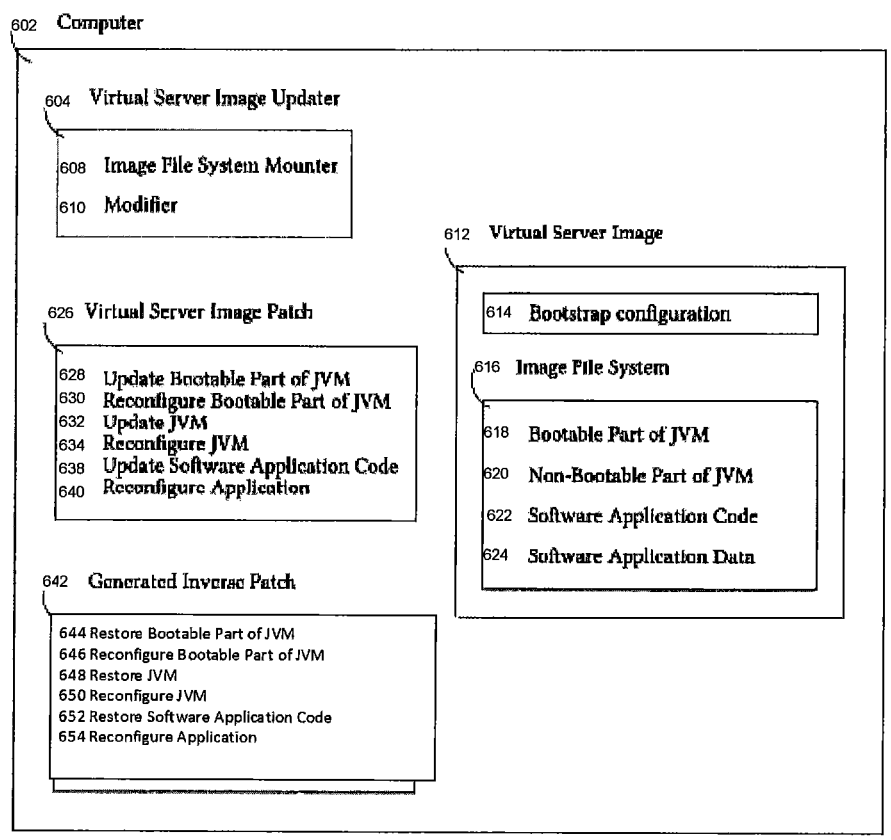
FIG. 8 shows an illustration of a system in accordance with an embodiment.

FIG. 8 shows an illustration of a system in accordance with an embodiment of the invention. As shown in FIG. 8, the system includes a computer 602 with a general operating system executing thereon. The computer maintains a virtual server image updater 604, comprising a file system mounter 608, and a modifier 610. The updater works on a virtual server image 612, comprising a bootstrap (or bootsector) configuration 614, and a file system 616. The file system comprises the bootable part of the JVM 618, the non-bootable part of the JVM 620, the software application code 622, and the software application data 624.

In accordance with an embodiment, the modifier 610 reads a virtual server image patch 626 comprising one or more of a new bootable part of the JVM 628, a reconfiguration of the bootable part of the JVM 630, a new non-bootable part of the JVM 632, a reconfiguration of the non-bootable part of the JVM 634, a new software application code 638, and a reconfiguration of the software application 640.

When the updater has performed the changes to the virtual server image as specified by the virtual server image patch, an inverse patch 642 is generated. The inverse patch comprises the previous bootable part of the JVM 644, the previous configuration of the bootable part 646, the previous JVM 648, the previous configuration of the JVM 650, the previous software application code 652, and the previous configuration for the software application 654. If the updater 604 is immediately executed with the inverse image patch 642 on the virtual server image 612, then all the changes are reversed.

Figure 9:
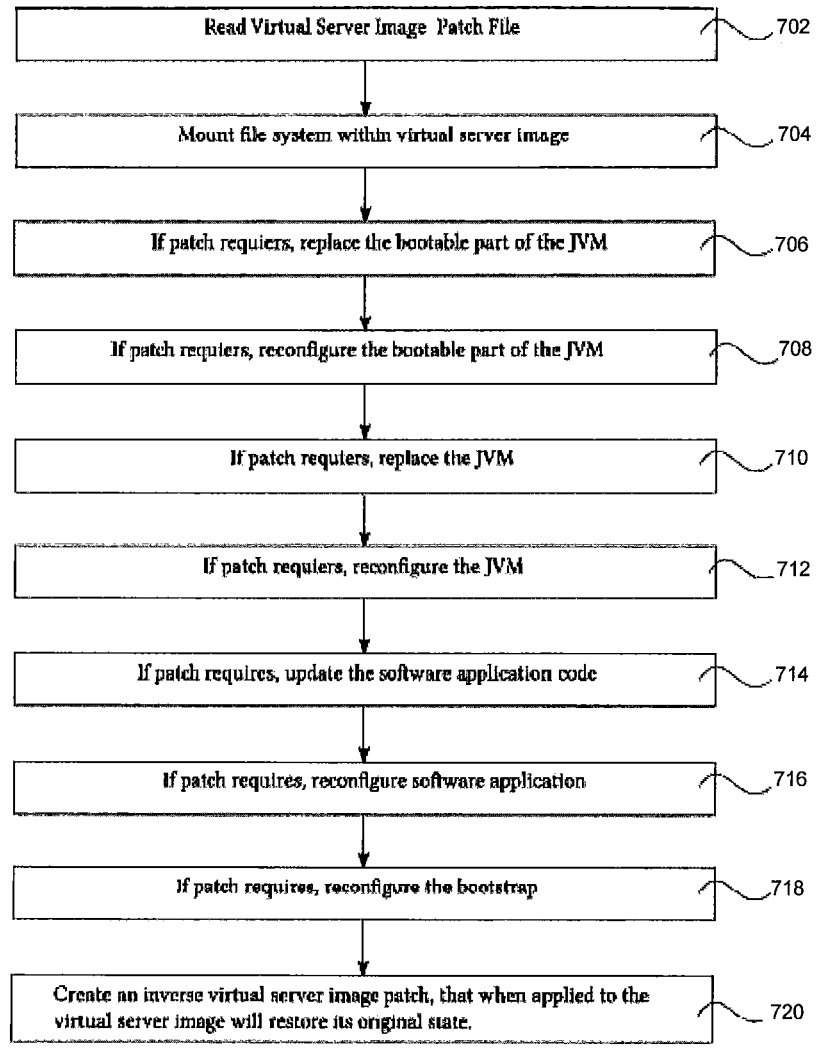
FIG. 9 shows a flowchart of a method in accordance with an embodiment, for reconfiguring a virtual server image.

FIG. 9 shows a flowchart of a method in accordance with an embodiment, for generating a Java virtual machine (JVM) appliance. In accordance with an embodiment, the appliance builder is first started on the system as a standard Java application, such as:

java-jar updater.jar [patch_file] [virtual_server_image file]

As shown in FIG. 9, in step 702, the updater reads the patch file, and uses the instructions from the patch file to determine how to reconfigure the virtual server image. In step 704, the updater mounts the file system located within the virtual server image. A file system contained within a file can generally be mounted using operating system tools (usually a loop-back device). The code to read and write the file system can also be implemented in the updater itself. In accordance with an embodiment, the file system is an ext2 file system commonly used in the operating system GNU/Linux, and the ext2 file system read and write, as well as the updater, are implemented in Java.

In step 706, if the patch so requires, the bootable part of the JVM is replaced with the one supplied within the patch. In accordance with an embodiment, the bootable part of the JVM is located within a subdirectory named /baremetal within the file system within the virtual server image. In an embodiment the bootable binary comprises /baremetal/boot.bin. The updater will replace this directory and its contents with the bootable part supplied by the patch. In step 708, if the patch so requires, the bootable part of the JVM is reconfigured, for example by updating the /bm.conf file located within the file system using the specification from the patch file, (in an embodiment using a process similar to how a standard posix tools diff/patch works).

In step 710, if the patch so requires, the non-bootable part of the JVM is replaced (in an embodiment it is located within the subdirectory /jvm) using the same process as the bootable-part of the JVM was replaced. In step 712, the configuration for starting the non-bootable part of the JVM is changed in the same way as the configuration for the bootable part. In accordance with an embodiment the configurations for both the bootable and the non-bootable parts are located within the same /bm.conf file.

In step 714, if the patch so requires the system applies changes to the software application code (in an embodiment located within the directory/application). In step 716, if the patch so requires the system reconfigures the software application in the same way as the previous reconfigurations were performed.

In step 718, if the patch so requires, the bootstrap configuration is updated. For example, for virtual server images compatible with VMWare, the bootstrap configuration is embedded in the bootsector of the virtual server image. For virtual server images compatible with Xen/OracleVM the bootstrap configuration is located within the subdirectory /boot/menu.cfg within the file system within the virtual server image.

In accordance with an embodiment, in step 720, an inverse patch file is generated by the updater. If the inverse patch file is applied to the reconfigured virtual server image, then the original state will be restored. The inverse patch comprises information from the virtual server image (in an embodiment the subdirectory /baremetal), and can therefore not be created before the actual patch is applied to the virtual server image. The other changes are easily calculated from the patch file, for example:

add-to-jvm-config is replaced with remove-from-jvm-config

Figure 10:
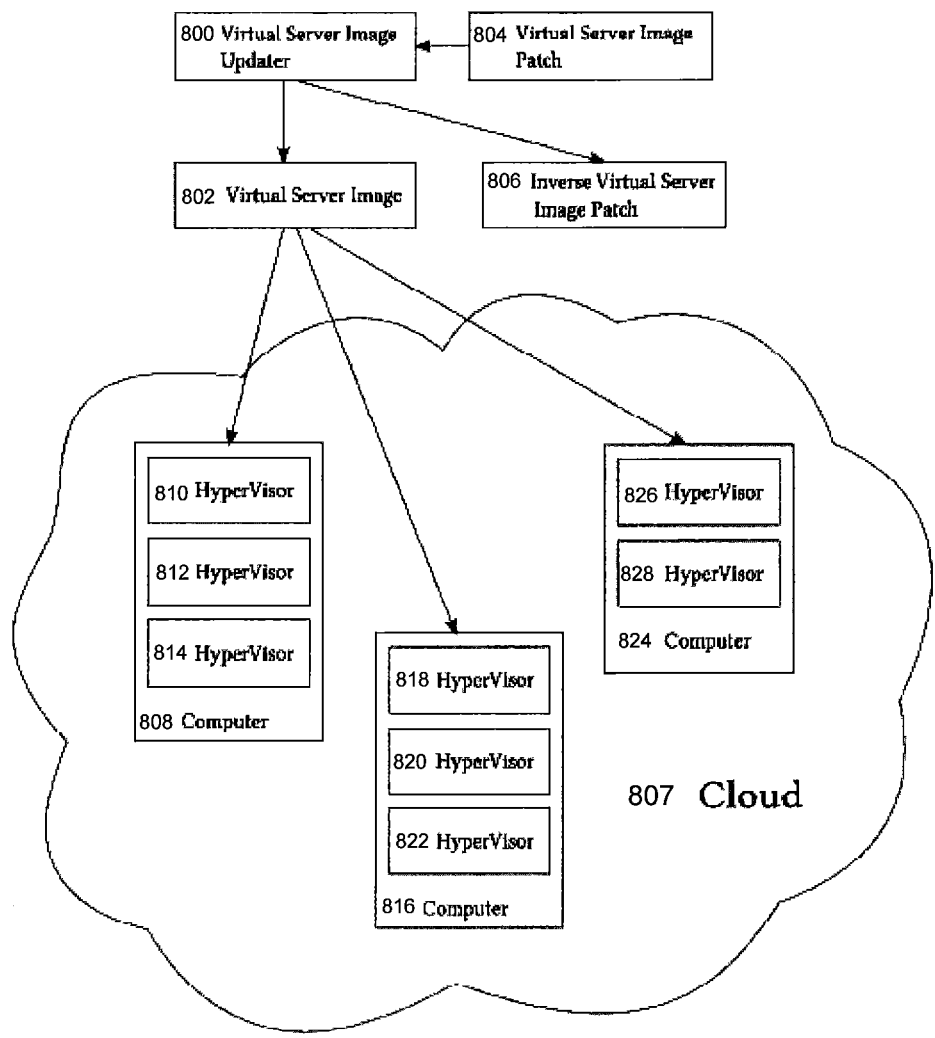
FIG. 10 shows an illustration of how a virtual server image can be reconfigured and then deployed to a cloud, in accordance with an embodiment.

FIG. 10 shows an illustration of how a virtual server image can be reconfigured and then deployed to a cloud, in accordance with an embodiment. As shown in FIG. 10, the virtual server image updater 800 updates a virtual server image to create an updated or reconfigured virtual server image 802, using the virtual server image patch file 804. The virtual server image is as a result updated, and an inverse patch file is generated 806. The inverse patch file is useful if the patched virtual server image misbehaves, or for any other reason the original behavior must be restored. The new virtual server image is then distributed (for example, in an embodiment by using NFS or scp (secure copy)) to one or more computers 808, 816 and 824 in a cloud 807, wherein each of the computers comprises one or more hypervisors 810, 812, 814, 818, 820, 822, 826, 828. The hypervisors then boot the reconfigured virtual server image.

Figure 11:
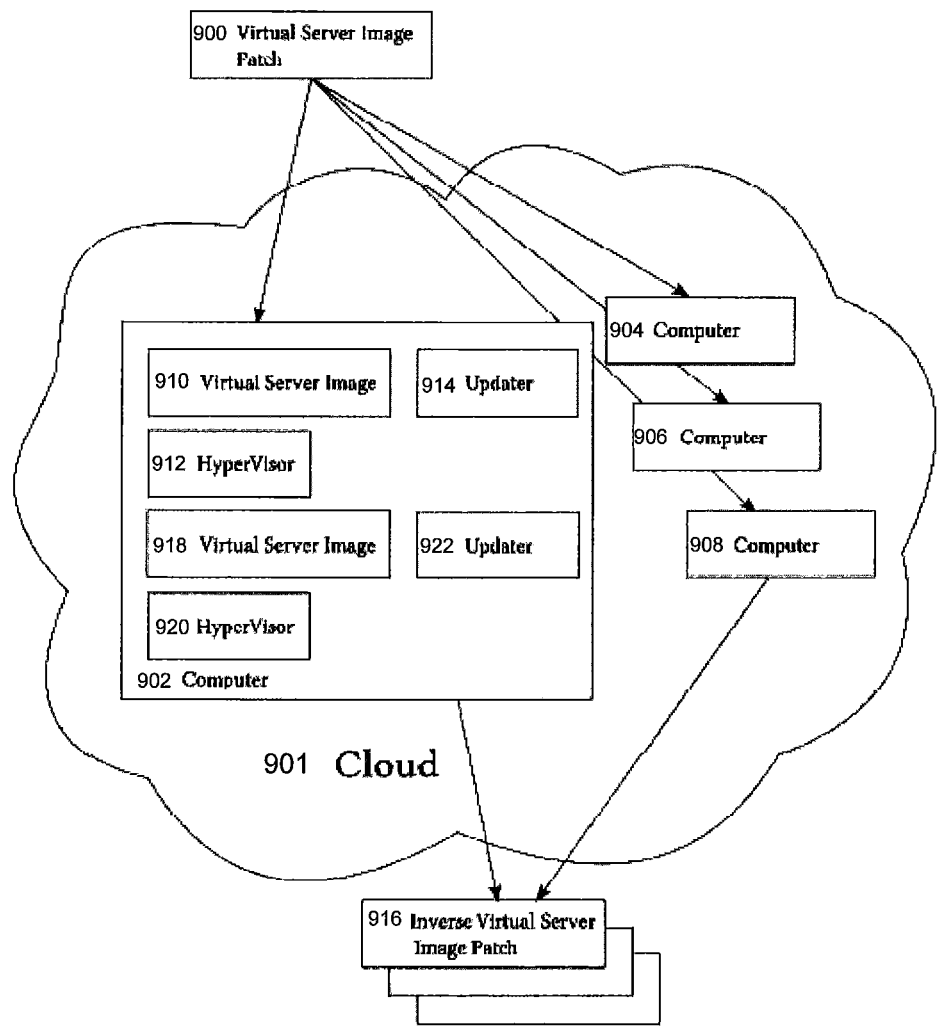
FIG. 11 shows an illustration of how virtual server images already deployed in a cloud can be reconfigured, in accordance with an embodiment.

FIG. 11 shows an illustration of how virtual server images already deployed in a cloud can be reconfigured, in accordance with an embodiment. As shown in FIG. 11, a virtual server image patch file 900 is distributed (again, for example, using NFS or scp (secure copy)) to the computers within a cloud 901. In each of the computers 902, 904, 906, 908 the hypervisors are shut down, and a virtual server image updater 914, 922 is run for each virtual server image 910, 918. The hypervisors are then restarted on the updated virtual server images. The generated inverse patch files are collected 916 (again, for example, using NFS or scp (secure copy) or locally at each computer) to be used later, if the patch has to be rolled back. In accordance with an embodiment the updater is part of the hypervisor. In accordance with other embodiments the updater fetches the patch automatically from a patch server.

Figure 12:
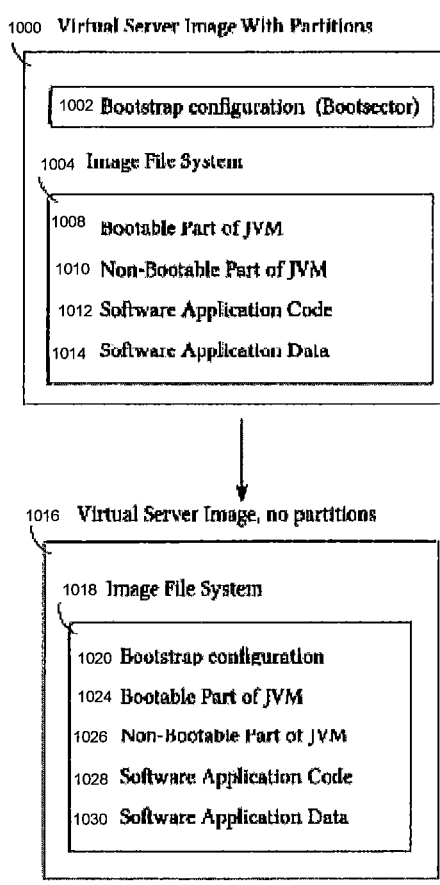
FIG. 12 shows an illustration of how a virtual machine image can be reconfigured from one hypervisor format to a different hypervisor format.

FIG. 12 shows an illustration of how a virtual machine image can be reconfigured from a first hypervisor format to a second or different hypervisor format, in accordance with an embodiment. As shown in FIG. 12, the virtual server image 1000 is compatible with a VMWare hypervisor, and therefore the image is formatted as if it was the contents of a hard drive, e.g. it will have partitions and a bootsector 1002 in the master boot record. One of the partitions will be the file system 1004 comprising the bootable 1008 and non-bootable 1010 part of the JVM, as well as the software application code 1012 and the software application data 1014. In accordance with an embodiment, the updater can rewrite this virtual server image into a virtual server image compatible with, e.g. an OracleVM hypervisor 1016, by extracting only the partition containing the image file system 1018. The new virtual server image contains the copied contents of 1008, 1010, 1012, 1014 stored into 1024, 1026, 1028, 1030. The boot information embedded in the bootsector that was previously the exact location (head/track/sector) on disk for /baremetal/boot.bin, will instead now be stored as a file name in the bootstrap configuration 1020 located within the file system (in an embodiment /boot/menu.cfg).

The above action is provided by way of example. In accordance with various embodiments, the updater is not limited to the above actions, but can also, e.g. resize the appliance to remove excessive virtual server image memory that is not in use, or to increase it for anticipated future use, or other actions. The updater can also record which patches have been applied to the virtual server image (in an embodiment this is recorded in the /patch_history.txt file within the file system within the virtual server image).

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for converting a software application into a virtual server image, comprising:

a computer including a processor, and an operating system;

a memory space in the computer for creating a virtual server image;

a Java virtual machine on the computer configured to execute a software application; and a builder application that operates to receive instructions that specify a particular type of hypervisor to be used with the virtual server image, determine, based on the specified particular type of hypervisor, whether to initialize the memory space with bootloader code, write a bootable component of the Java virtual machine into the memory space, write a non-bootable component of the Java virtual machine, together with the software application, into the memory space, configure the bootable component of the Java virtual machine in the memory space to execute the non-bootable component therein, and write the memory space to the virtual server image for deployment to the specified particular type of hypervisor.

2. The system of claim 1, wherein the builder application further operates to configure the bootloader code to execute the bootable component of the Java virtual machine in the memory space.

3. The system of claim 1, wherein the memory space is allocated in RAM in the computer.

4. The system of claim 1, wherein the builder application is further configured to read a configuration file that specifies a location of code and data of the software application.

5. The system of claim 1, further comprising an updater that operates to update the software application and the Java virtual machine without disturbing application data of the software application.

6. The system of claim 1, wherein the specified particular type of hypervisor uses the virtual server image as a snapshot of sectors of a virtual hard disk, and the bootloader code is written into the memory space.

7. The system of claim 1, wherein configuring the bootable component to execute the non-bootable component includes updating the bootable component with a location of the non-bootable component.

8. A method for converting a software application into a virtual server image, comprising:
   executing a builder application on a computer including a processor, and a memory space for creating a virtual server image from a Java virtual machine configured to execute a software application;
   receiving instructions that specify a particular type of hypervisor to be used with the virtual server image;
   determining, based on the specified particular type of hypervisor, whether to initialize the memory space with bootloader code;
   writing a bootable component of the Java virtual machine into the memory space;
   writing a non-bootable component of the Java virtual machine, together with the software application, into the memory space;
   configuring the bootable component of the Java virtual machine in the memory space to execute the non-bootable component therein; and
   writing the memory space to the virtual server image for deployment to the specified particular type of hypervisor.

9. The method of claim 8, further comprising
   configuring the bootloader code to execute the bootable component of the Java virtual machine in the memory space.

10. The method of claim 8, wherein the memory space is allocated in RAM in the computer.

11. The method of claim 8, further comprising
   reading, via the builder application, a configuration file that specifies a location of code and data of the software application.

12. The method of claim 8, further comprising
   using an updater to update the software application and the Java virtual machine without disturbing application data of the software application.

13. The method of claim 8, wherein the specified particular type of hypervisor uses the virtual server image as a snapshot of sectors of a virtual hard disk, and the bootloader code is written into the memory space.

14. The method of claim 8, wherein configuring the bootable component to execute the non-bootable component includes updating the bootable component with a location of the non-bootable component.

15. A non-transitory computer-readable storage medium, including instructions stored thereon, which when read and executed by a computer cause the computer to perform the steps comprising:
   executing a builder application on a computer including a processor, and a memory space for creating a virtual server image from a Java virtual machine configured to execute a software application;
   receiving instructions that specify a particular type of hypervisor to be used with the virtual server image;
   determining, based on the specified particular type of hypervisor, whether to initialize the memory space with bootloader code;
   writing a bootable component of the Java virtual machine into the memory space;
   writing a non-bootable component of the Java virtual machine, together with the software application, into the memory space;
   configuring the bootable component of the Java virtual machine in the memory space to execute the non-bootable component therein; and
   writing the memory space to the virtual server image for deployment to the specified particular type of hypervisor.

16. The non-transitory computer-readable storage medium of claim 15, further comprising
   configuring the bootloader code to execute the bootable component of the Java virtual machine in the memory space.

17. The non-transitory computer-readable storage medium of claim 15, wherein the memory space is allocated in RAM in the computer.

18. The non-transitory computer-readable storage medium of claim 15, further comprising
   reading, via the builder application, a configuration file that specifies a location of code and data of the software application.

19. The non-transitory computer-readable storage medium of claim 15, further comprising
   using an updater to update the software application and the Java virtual machine without disturbing application data of the software application.

20. The non-transitory computer-readable storage medium of claim 15, wherein the specified particular type of hypervisor uses the virtual server image as a snapshot of sectors of a virtual hard disk, and the bootloader code is written into the memory space.

21. The non-transitory computer-readable storage medium of claim 15, wherein configuring the bootable component to execute the non-bootable component includes updating the bootable component with a location of the non-bootable component.

* * * * *

UNITED STATES PATENT AND TRADEMARK OFFICE
CERTIFICATE OF CORRECTION

| | | |
|---|---|---|
| PATENT NO. | : 9,239,814 B2 | Page 1 of 1 |
| APPLICATION NO. | : 14/164503 | |
| DATED | : January 19, 2016 | |
| INVENTOR(S) | : Lagergren et al. | |

It is certified that error appears in the above-identified patent and that said Letters Patent is hereby corrected as shown below:

In drawings,

On sheet 9 of 12, in FIGURE 9, under reference numeral 706, delete "requiers," and insert -- requires, --, therefor.

On sheet 9 of 12, in FIGURE 9, under reference numeral 708, delete "requiers," and insert -- requires, --, therefor.

On sheet 9 of 12, in FIGURE 9, under reference numeral 710, delete "requiers," and insert -- requires, --, therefor.

On sheet 9 of 12, in FIGURE 9, under reference numeral 712, delete "requiers," and insert -- requires, --, therefor.

Signed and Sealed this
Sixteenth Day of August, 2016

Michelle K. Lee
*Director of the United States Patent and Trademark Office*